Dec. 15, 1942.   W. C. GRABAU   2,304,815
VOLTAGE REGULATOR
Filed Jan. 23, 1939
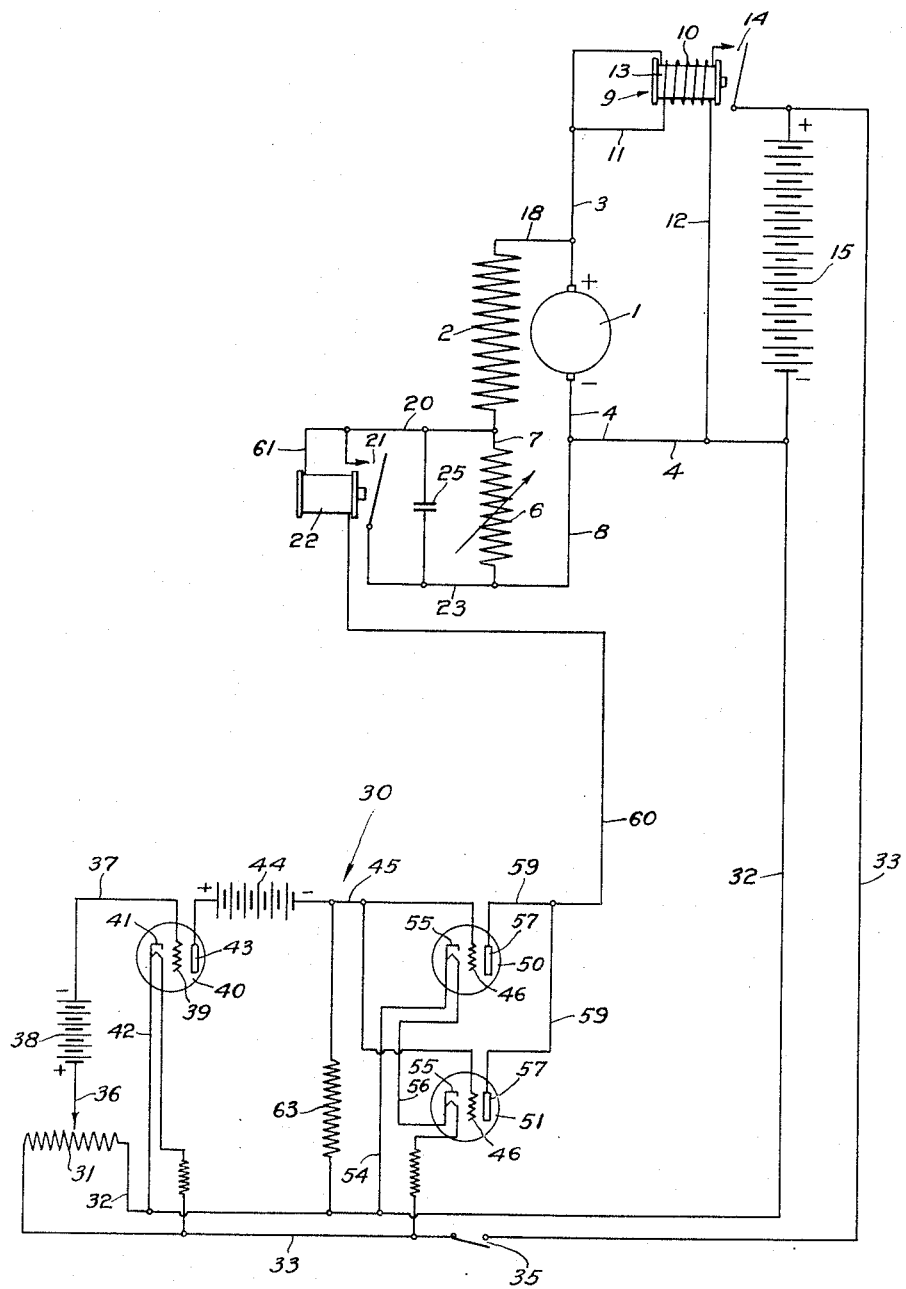
INVENTOR.
William Christian Grabau Patented Dec. 15, 1942

2,304,815

UNITED STATES PATENT OFFICE 2,304,815

VOLTAGE REGULATOR

William Christian Grabau, San Francisco, Calif., assignor, by mesne assignments, to Submarine Signal Company, Boston, Mass., a corporation of Maine Application January 23, 1939, Serial No. 252,341

4 Claims. (Cl. 171—229)

This invention relates to automatic voltage regulators and is an improvement over the voltage regulator disclosed in my copending patent application filed on October 8, 1938, Serial No. 234,067.

In my said application I made use of a generator having a separate exciter for the generator filed. As comparatively few generators nowadays have separate exciters, it was necessary to install the same in addition to the existing generators and as a part of my voltage regulator. The installation of a separate exciter, although entirely feasible, nevertheless proved to be mechanically undesirable in some cases. Hence, the object of this invention is to improve and simplify the automatic voltage regulator as disclosed in my said copending patent application, so that the same may be used in connection with generators with or without separate exciters.

Further object of my invention is to eliminate the necessity of having a separate exciter for a generator, and to provide a voltage regulator which is entirely devoid of mechanical movements.

Another object of my invention is to provide an automatic voltage regulator which does not require any additional mechanical equipment for its installation in any electric system.

Another object of my invention is to provide an automatic voltage regulator which is cheap to manufacture, and inexpensive to install and maintain.

Another object of my invention is to provide an automatic voltage regulator which is simple in construction, reliable, and efficient for the purpose intended.

Other objects and advantages will be apparent as the specification proceeds and the novel features of the device will be particularly pointed out in the appended claims.

My invention is illustrated in the accompanying drawing which represents a wiring diagram of my device.

The drawing shows a generator 1 having a generator field winding 2. The power lines 3 and 4 are connected to the generator and may have branches attached thereto leading to electric motors, lamps, radios, and other electric appliances. The generator 1 usually has a variable resistance 6 connected to it, or it may be easily added thereto, which is in series with the field winding 2 and is connected to the latter by a wire 7. A wire 8 connects the resistance 6 with the power line 4.

When current produced by the generator 1 will reach certain voltage, it will close a relay 9 by means of a winding 10 one end of which is connected by a wire 11 to the line 3, and the other end by a wire 12 to the line 4. The moment the relay 9 is closed the current runs through the line 3, the winding 13 on the relay 9, switch 14 to a storage battery 15, and therefrom to the line 4 and back to the generator 1, thus keeping said relay closed.

A portion of the current will be used to energize the generator field 2, which is connected to the line 3 by a wire 18. The current will run from the power line 3 through the wire 18, field winding 2, wire 7, resistance 6. wire 8, and to the line 4.

In connection with the above described generator field circuit, I provide an additional circuit consisting of a wire 20 leading from the wire 7, a switch 21 operated by a relay 22, and a wire 23 connecting said switch with the wire 8. A condenser 25 is interposed between the wires 20 and 23. Whenever the switch 21 is closed the variable resistance 6 is cut off and the current from the line 3 will pass through the wire 18, field winding 2, wire 20, switch 21, wire 23, wire 8, and the line 4. In this case maximum of current will pass through the generator field 2, and accordingly the output of the generator 1 will be increased to its maximum. Whenever the switch 21 is opened, the current from the line 3 will be forced to flow through the field winding 2, wire 7, variable resistance 6, wire 8, and the line 4. The predetermined minimum of current, which may be set at the desirable level by means of the variable resistance 6, will pass through the generator 1 in the latter case, and accordingly the output of the generator will drop to its minimum. Therefore the output of the generator 1 may be regulated by rapid successive closing and opening of the switch 21, and may be maintained at any level between its maximum and minimum. The output of the generator 1 will depend upon the interval of time the switch 21 stays closed in average: the longer it is, the higher is the output; and the shorter it is, the smaller is the output.

When the switch 21 is rapidly vibrating, the generator will produce a pulsating current, but in practice the rate of pulsation is so great that it will have no effect upon the operation of machinery or the electric lights.

The means I employ for operating the relay 22 consists of a vacuum tube regulator which is generally indicated by numeral 30 and which consists of an adjustable resistor 31 connected by wires 32 and 33 and through a switch 35 with the negative and positive poles of the battery 15 respectively. A pointer 36 of the adjustable resistor 31 is connected with a positive pole of a battery 38 which is preferably of inexpensive dry cell type. A negative pole of the battery 38 is connected by means of a wire 37 with the grid 39 of a first vacuum amplifying tube 40 of the regulator 30. The cathode 41 of said tube is connected by a wire 42 to the wire 32. The battery 38 may be of any voltage, as for instance 9 volts. The pointer 36 may be so set on the resistor 31 that the positive voltage of that point of the resistor is less than 9 volts, as for instance 8 volts. Therefore the current will flow from the battery 38, through the pointer 36, resistor 31, wire 32, wire 42, cathode 41, grid 39, wire 37, to the battery 38. The negative voltage of the grid 39 is determined and may be varied by the position of the pointer 36.

Assuming that the voltage in the lines 3 and 4 is increasing, the negative voltage of the current flowing through the grid 39 in the last described circuit is reduced, and the plate current in said tube 40 is correspondingly increased. When the voltage in the lines 3 and 4 decreases, the reverse takes place. These changes are instantaneous and proportionate to the variations of voltage in said lines 3 and 4.

The plate 43 of the tube 40 is connected with a positive pole of a battery 44, of the same type as the battery 38, and the negative pole of said battery is connected by a wire 45 with the grids 46 of the secondary vacuum amplifying tubes 50 and 51. The cathodes 55 of said tubes are connected in series by a wire 56, and are connected to the wire 32 by a wire 54. The plates 57 of the secondary tubes are connected by wires 59 to a wire 60 which leads to one end of the winding of the relay 22. A resistor 63 is interposed between the wires 32 and 45.

If the negative voltage of the grid 39 of the tube 40 is such that no plate current is flowing therein, no current will be flowing through the resistor 63, and consequently no negative potential will appear on the grids 46, and full plate current will flow in the tubes 50 and 51. But as soon as the negative bias of the grid 39 drops, current starts to flow through the plate 43, cathode 41, and wire 32. A negative potential is impressed upon the grids 46, and the current flow in the plate circuit of the secondary tubes 50 and 51 decreases. As the plates 57 are in circuit with the relay 22, the variations in flow of the plate current will close and open the switch 21.

When the switch 21 is opened, the current is flowing from the generator through, wires 3, 18, generator field 17, wire 7, resistor 6, wires 8 and 4, back to the generator. As has been previously explained, the current flowing through the above described circuit is comparatively small, and the generator produces minimum of current. The voltage in the lines 3 and 4 is then at its minimum, therefore the negative potential of the grid 39 of the tube 40 is at its maximum and the flow of the plate current in the secondary tubes 50 and 51 is at their maximum also. The flow of the current through the relay 22 closes the switch 21 and increases the flow of the current in the generator field 2 to its maximum. Consequently the generator's output is momentarily raised to its maximum. The voltage in the lines 3 and 4 raises, and the negative bias of the grid 39 correspondingly falls. The flow of the plate current in the secondary tubes 50 and 51 falls, and the switch 21 opens. This process repeats over and over again, the rate of repetition depending upon the load on the lines 3 and 4 and the output of the generator 1. The greater is the load the more time in average the switch will remain closed. In actual practice the rate of vibration of the switch 21 is so high that the change in the voltage in the lines 3 and 4 has no effect upon the light, electric motors, and other electric appliances.

It shall be noted that while one end of the winding of the relay 22 is connected by the wires 60 and 59 with the plates 57 of the secondary tubes 50 and 51, the other end of said winding is connected by a wire 61 to the wire 20. When the switch 21 is opened, positive current flows from the line 3 through the generator field 2, wires 20 and 61, to the winding of the relay 22, and through the wires 60 and 59 to the plates 57. When the voltage in the lines 3 and 4 is built above predetermined level, the switch 21 still being closed, the wires 7 and 8 represent the same electrical potential, namely negative. Therefore the electrical potential across the tubes 50 and 51 is zero, and consequently the plate current in said tubes is instantly reduced to zero, thereby opening the relay 22 instantly. This method of connecting the winding of said relay results in very fast opening of the same.

In case a generator has a separate exciter thereto the identical circuit is arranged in connection with the exciter field instead of a generator field, and the action of the regulator remains the same.

I claim:

1. In combination with a generator having a shunt circuit comprising a field winding and field resistance in series with each other, a thermionic tube control circuit for producing an output current in response to input voltage variation, said circuit having a thermionic input tube with cathode and control grid operatively connected to the generator terminals whereby the input voltage variations are impressed upon said thermionic tube control circuit, and a thermionic tube in the output of the same control circuit having its anode and a relay in series in the output of said control circuit, operatively connected to the junction of the said field winding and resistance and having its cathode connected to said generator terminals, whereby plate voltage is provided for said tube, said relay having its switch contacts connected across said field resistance, whereby the closing of said relay switch contacts reduces instantaneously said plate voltage and causes a collapse of the plate current.

2. In combination with a generator having a shunt circuit comprising a field winding and field resistance in series with each other, a thermionic tube control circuit for producing an output current in response to input voltage variation, said circuit having a thermionic input tube with cathode and control grid operatively connected to the generator terminals whereby the input voltage variations are impressed upon said thermionic tube control circuit, and a thermionic tube in the output of the same control circuit having its anode operatively connected to the junction of said field winding and resistance and having its cathode connected to said generator terminals, whereby plate voltage is provided for said tube, and means operatively associated in the plate circuit of said tube for short circuiting said field resistance whereby said plate voltage is instantaneously reduced and also said plate current.

3. In combination with a generator having a shunt circuit comprising a field winding and field resistance in series with each other, a thermionic tube control circuit for producing an output current in response to input voltage variation, said circuit having a thermionic input tube with cathode and control grid operatively connected to the generator terminals, and a thermionic tube in the output of the same control circuit having its anode and a relay in series and connected to the junction of said field winding and resistance, the cathode of said tube being connected to the same potential as the other end of said field resistance and means connecting the relay armature switch across said field resistance whereby the operation of said relay causes the current therethrough to collapse.

4. In combination with a generator having a shunt circuit comprising a field winding and a field resistance in series with each other, a thermionic tube control circuit for controlling the generator voltage, said circuit including an input thermionic tube having applied to its control grid a potential which is a function of the generator output potential, a relay and an output thermionic tube having its control grid connected in the anode circuit of said input tube and having in its anode-cathode circuit the operating coil of said relay and said field resistance in series, whereby said field resistance provides anode voltage for said output tube and switch contacts in said relay connected across said field resistance and adapted to be closed upon energization of the relay, whereby the anode voltage of said output tube is instantaneously reduced, causing a collapse of the anode current and a consequent reopening of said relay contacts.

WILLIAM CHRISTIAN GRABAU.